Oct. 5, 1965 W. A. LINDBLOOM 3,210,473

TRUNK CIRCUIT PAD-CONTROL ARRANGEMENTS

Filed Dec. 20, 1962 2 Sheets-Sheet 1

MAIN OFFICE

INVENTOR.
William A. Lindbloom

BY C. A. Gulbrandsen

ATTY.

Oct. 5, 1965 W. A. LINDBLOOM 3,210,473

TRUNK CIRCUIT PAD-CONTROL ARRANGEMENTS

Filed Dec. 20, 1962 2 Sheets-Sheet 2

United States Patent Office 3,210,473
Patented Oct. 5, 1965

3,210,473
TRUNK CIRCUIT PAD-CONTROL ARRANGEMENTS

William A. Lindbloom, Lombard, Ill., assignor to Automatic Electric Laboratories, Inc., Northlake, Ill., a corporation of Delaware Filed Dec. 20, 1962, Ser. No. 246,113
5 Claims. (Cl. 179—16)

Figure 1:
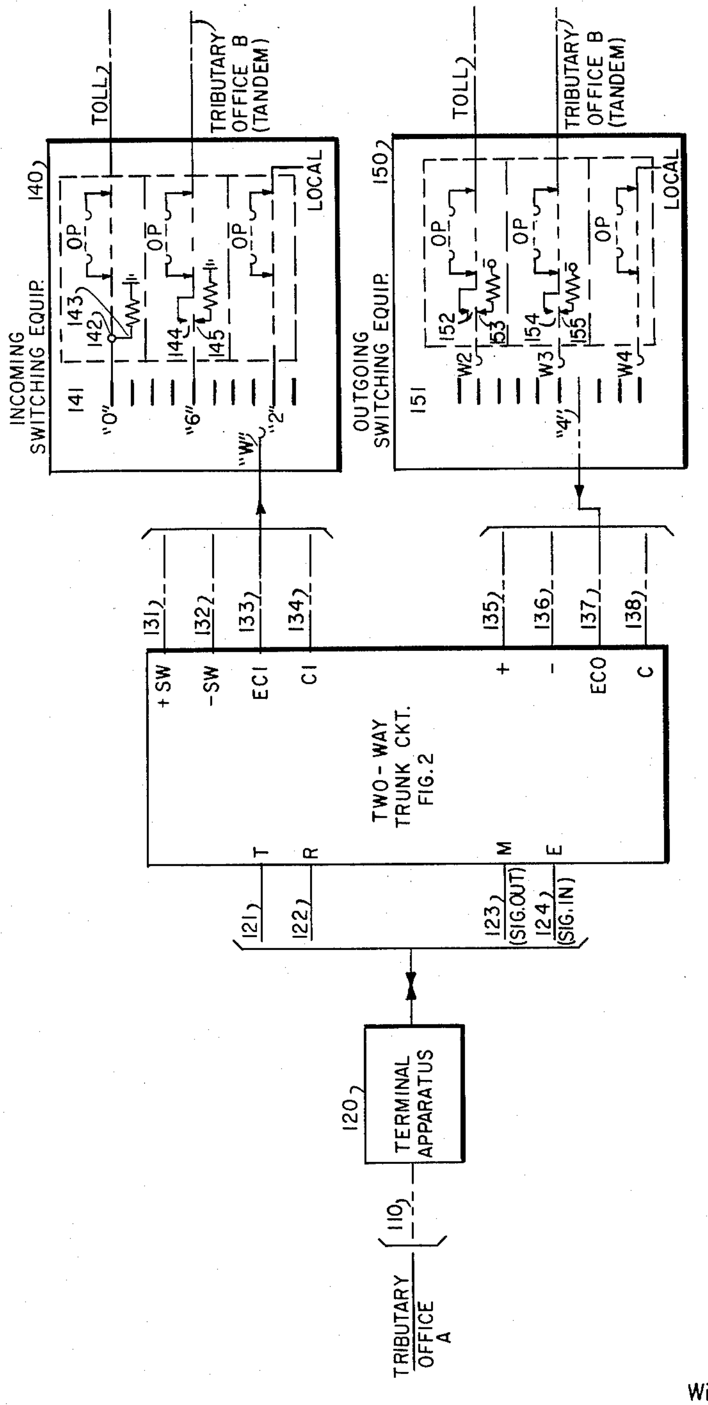

This invention relates to telephone systems in general and more particularly to improved arrangements for controlling the transmission losses on telephone connections established in the nationwide network of telephone systems. The technique, used in this arrangement, permits a control of the transmission levels according to over-all system objectives, and, in particular, it provides a flexible control over attenuating pads to be used, or not to be used, depending on the type of the telephone connection.

Numerous techniques have heretofore been employed for controlling levels-of-transmission on a telephone call, usually a toll call, by the use of a pad in the transmission path. Some of these arrangements involved a segregation of the interoffice toll trunks and the use of trunk circuits having fixed-pad losses; while in other arrangements, transmission level controlling pads were individually associated with the trunk terminations and means were controllable from the termination for rendering the pads effective, or non-effective, dependent on the routing of the calls. Furthermore, in the case of the latter arrangements, the toll operator often had means for controlling the pad losses on the transmission path, whereas in the case of the automatic switching of calls pad controls were effected in several fashions, such as on a bank level basis, by way of selector off-normal springs, or possibly by relays, in trunk circuit, according to the direction or the origin of the call.

The present invention has as its general objective to facilitate automatic differentiation between various types of connections so that the transmission level will meet the over-all via-net-loss switching standards set for the telephone system.

A more specific object of this invention is to provide a two-way trunk circuit, in a main office, arranged for the control of transmission levels on various types of connections, such as toll, local, and tandem types of calls between the main office and a plurality of tributary offices.

According to the principal feature of the invention, an arrangement is provided wherein the transmission-loss controlling means is automatically responsive to an electric marking applied to a point in the incoming switch train, and also responsive to an electric marking applied to a point in the outgoing switch train. In the specific embodiment of the invention disclosed herein, a control relay in the two-way trunk circuit is operative to remove the transmission-loss pad on toll and tandem types of connections.

A further feature of the invention is an arrangement which permits the trunk from the tributary office to be terminated in the normal condition of the trunk and remove the termination upon seizure of the trunk and then restore the trunk to its terminated condition without delay at the beginning of each impulse series. According to this arrangement, the incoming signaling conductor in a signaling branch from the tributary office includes one winding of a fast-acting control relay and a winding of the impulsing relay. The control relay operates, upon seizure of the trunk circuit from, or to, the tributary office, to remove the line-termination normally across the voice-branch two-line conductors and to switch the conductors to a termination on the transmission-loss controlling pad. Furthermore, upon receipt of the first digital-impulse of a series at the trunk circuit, in either incoming or outgoing directions, the control relay restores the above-mentioned line-termination across the two-line conductors for the duration of the impulse series. The control relay re-operates subsequently and prepares a path to the pad-loss controlling means from a point in either the incoming or outgoing switch trains, depending upon the direction of the call. The pad controlling means may be a relay operative in response to an electric marking from either of the above-mentioned switch trains, resulting in the removal of the pad from the transmission path established through the trunk circuit.

Yet another feature of the invention is the arrangement wherein the path used in controlling the transmission pad of the trunk circuit is also used as the medium for the transfer of supervisory signals to and from the trunk circuit.

Further features of the invention relate to the particular arrangement of the elements thereof, whereby the above-outlined and additional operating features are attained.

The invention, both as to its organization and method of operation, together with further objects and advantages thereof, will best be understood by reference to the following detailed description of a preferred embodiment, taken in conjunction with the accompanying drawings. These drawings, FIGS. 1 and 2 inclusive, show, by means of the usual circuit diagrams, a sufficient amount of apparatus to enable the invention to be described and understood.

Figure 2:
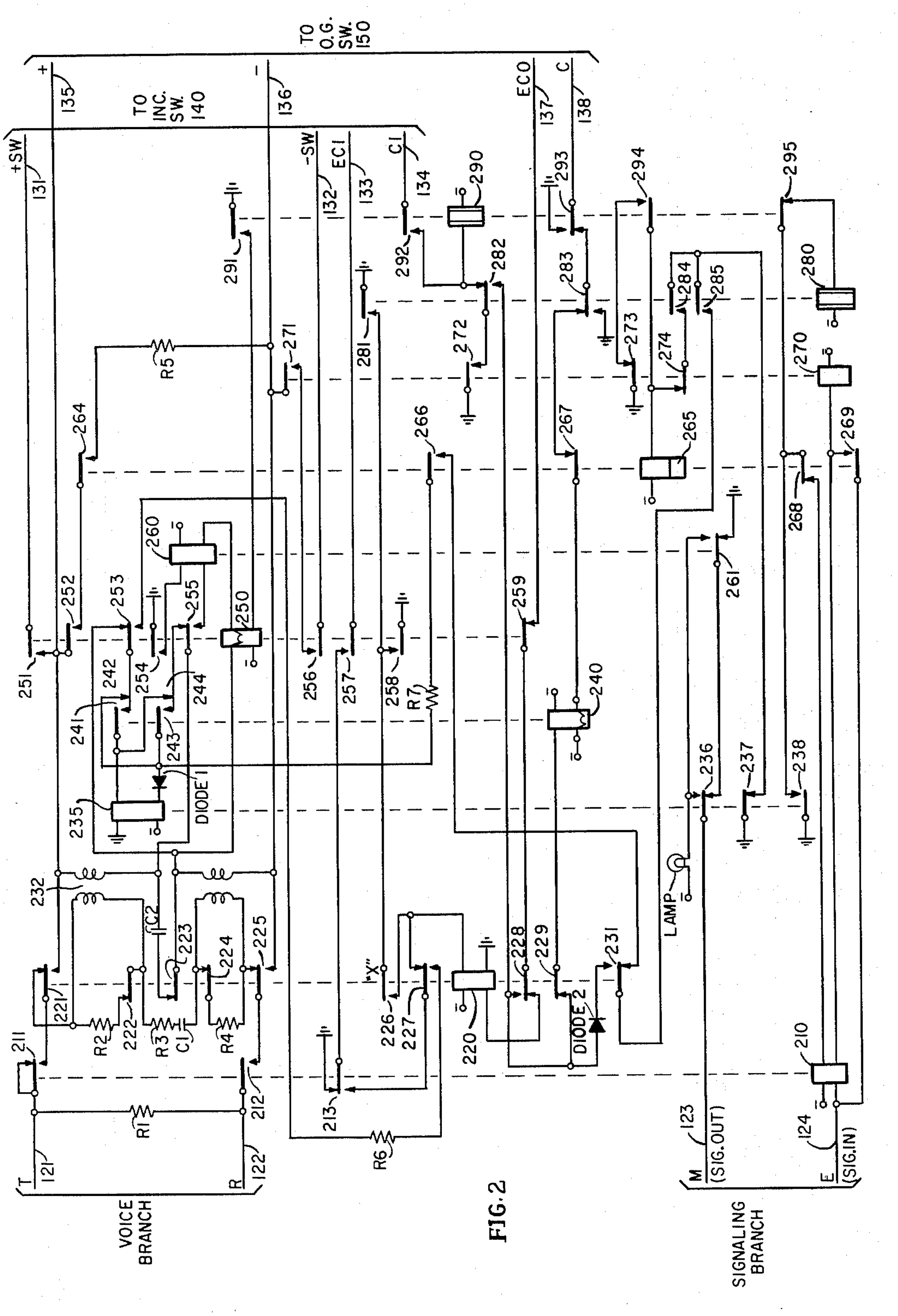

FIG. 1 shows, in the main body, main office equipment comprising: a two-way trunk circuit, FIG. 2, interconnected with a tributary office A, on the left hand, by way of a communication medium terminated on terminal apparatus. FIG. 1 also shows the above-mentioned trunk circuit connected by way of the upper right-hand portion of FIG. 1, to incoming switching equipment comprising only the "CE1" bank wipers and bank-level contacts of an incoming switch train, through which are established connections to trunk circuits for handling a plurality of types of telephone calls, namely: toll, tributary office tandem calls, or local office calls, each being handled by fully-automatic switching methods or otherwise with the aid of an operator, when required. FIG. 1 also comprises outgoing switching equipment comprising the "ECO" bank wipers and multiple bank-contacts of well-known outgoing switch trains which are used individually for each of the above-mentioned toll, tandem, and local types of telephone connections, either by fully automatic switching methods or established with the aid of an operator. The block diagrams for the incoming and the outgoing switching equipments show arrangements for the application of an electric marking to points, such as directly on the bank contact, or in the trunk circuit, in the switch trains, whereby the transmission-loss pad in the trunk circuit, FIG. 2, is removed from the transmission path upon the establishment of toll and tandem types of connections.

FIG. 2 shows the details of a two-way trunk circuit, in the main office, having arrangements for controlling the transmission losses on toll, tandem, and local call connections established by way of switch trains which are incoming or outgoing in direction with respect to an interconnected tributary office.

GENERAL DESCRIPTION

In the embodiment described herein, reference is made to the incoming and outgoing switching arrangements of FIG. 1 and particularly to telephone connections set up, using well known automatic-switching methods, between a tributary office A and terminal apparatus 120 in the Main Office by way of a communication medium 110.

The terminal apparatus may be of the type, such as carrier or microwave facilities, connecting to the two-way trunk circuit, FIG. 2, by way of a voice-branch with two line conductors 121 and 122, and a signaling branch, including incoming and outgoing signaling conductors 124 and 123 respectively.

INCOMING CALLS FROM TRIBUTARY OFFICE A

The techniques for establishing connections from a tributary office A, FIG. 1, to the main office trunk circuit and associated incoming switch train, by means of series of digital impulses, for the setting up of connections on several types of calls are well known in the telephone art. Tributary office access over the interoffice comunication medium 110 causes the seizure of the main office terminal apparatus 120 and a ground (not shown) marking on the (sig.-in) conductor E, 124, corresponding to a like designation in the trunk circuit FIG. 2.

*Seizure.*—The above-mentioned ground on conductor 124 operates the impulsing relay 270 and fast-acting control relay 210 over an obvious path including the winding of relay 270 and the lower winding of control relay 210 connected in series.

Upon the operation of the above-seized relay 270, control circuits are established for guarding the trunk circuit, FIG. 2, from seizure, by outgoing switch trains, and for completing a loop-seizure-pulsing path to the selector (not shown) of the incoming switch train. Particularly, slow-to-release relay 290 operates over a path traced from ground, make-contacts 272, back-contacts 282 of relay 280, the winding of relay 290 to battery. The operated relay 290, at its make-contacts 293, closes ground to conductor C, 138, for guarding the trunk circuit. The operated relay 290 also closes make-contacts 291 in a path from ground, lower winding of relay 250, to battery. Relay 250 operates. The trunk circuit, FIG. 2, portion of the above-mentioned seizure-pulsing path to the incoming selector is traced as a loop between conductors +SW131 and —SW132 consisting of make-contacts 251, 255 and 256 of relay 250, the right-hand windings of repeating coil 232, the lower winding of relay 260, the upper resistance-winding of relay 250, and the make-contacts 271 of impulsing relay 270. The closure of the above-traced loop circuit brings about a seizure of the incoming selector switch and causes it to return a ground (not shown) over conductor C1, 134, for holding the previously mentioned relay 290 operated by way of make-contacts 292 and the winding of relay 290, to battery. The above-mentioned relay 260 is a supervisory relay, for incoming calls, with the lower winding and upper winding in magnetic opposition. The relay did not operate from its lower winding in the above traced loop circuit to the incoming selector switch since the magnetic field thereby produced was opposed by the magnetic field of the upper winding path through make-contacts 254 of operated relay 250.

The controls resulting from the operation of the fast-acting relay 210 in the incoming signal conductor 124 will be described under "General Switching Operations" of this specification as they are more pertinent to terminations for the voice branch of the trunk circuit and the control of some supervisory circuits rather than seizure operations as has been described.

*General switching operations.*—Upon seizure of main office equipment, as above-described, the series of impulses received over the incoming signal conductor E, 124, FIG. 2, control the trunk circuit and the incoming switch train, according to predetermined codes, for establishing the types of call connections desired. For brevity in this description, assume that local type calls are switched on incoming selector level "2," tributary tandem calls on level "6," and toll calls on level "0."

According to one feature of the invention, as mentioned above, the incoming signaling conductor, 124, of the trunk circuit includes one winding of a control relay, 210, operative to remove the line termination normally across the voice-branch two-line conductors and to switch the conductors to a termination on the transmission-loss controlling pad. It is obvious, from drawing FIG. 2, that the seizure of the trunk circuit and the operation of the control relay 210, as above-described, switches the voice-branch conductors T121, and R122, from their bridged termination path including resistor R1 and back-contacts 211, to a second bridging path traced through back-contacts 221 and 225, of relay 220, in series with resistor R3 and capacitor C1 joining the upper and lower sections of a pad network each section having the corresponding left windings of a repeating coil 232 in multiple with a branch having a resistor R2 and R4 in series with associated back-contacts 222 and 224 of relay 220, respectively. As a further qualification of the above-mentioned feature of this invention, control relay 210 is fast-acting with respect to impulsing relay 270 so that upon receipt of each first impulse of an impulse series, regardless of the switching codes dialed, relay 210 restores its contacts 211 and 212. This insures that the voice-branch of the trunk circuit is properly terminated and furthermore that any spurious effects of impulses in the previously described loop impulsing path to the incoming selector switch will not be reflected into the voice-branch circuitry, by way of the repeating coil, 232, windings.

The following descriptions are directed to other circuit operations and specifically to controls of the transmission-loss pad on several types of calls.

The first impulse, originating in the tributary office A for the setting-up of calls in the main office by way of the trunk circuit, FIG. 2, and associated incoming selector switch, partially shown in FIG. 1, is a removal of ground (not shown) from signal-in conductor 124, FIG. 2, bringing about a voice-branch termination by relay 210, as described above. Removal of the same ground from conductor 124 permits the impulsing relay 270 to restore its contacts, 273, and control the slow-to-release relay 265. The control circuit for relay 265 is traced from ground, contacts 273, contacts 294, of relay 290, and the winding, relay 265, to battery. Relay 265 operates, remains operated for the remainder of the impulsing period, and, at make contacts 269 closes a short-circuit path to the lower winding of control relay 210. The short-circuit path insures that relay 210, through its lower winding, will not reoperate from additional impulses of the impulse series, and thereby cause a removal of the above-described voice-branch termination. Furthermore, make-contacts 264, of operated relay 265, close to form a non-inductive loop impulsing path in multiple with the inductive portion of the above-described impulsing path comprising the right-hand windings of repeating coil 232 and the lower winding of supervisory relay 260. The non-inductive impulsing path is traced as a loop between conductors +SW131 and —SW132 consisting of make-contacts 251, 252 and 256 of relay 250, make-contacts 264 of relay 265, resistor R5, and impulsing contacts 271, when closed again, at the end of the above-mentioned first impulse by the operation of relay 270.

The foregoing relay operations, resulting from the first impulse, have prepared the trunk circuit, FIG. 2, and the incoming switch train, partially shown in FIG. 1, for additional impulses of the series.

*Incoming local calls.*—Upon receipt, from the tributary office, of the second impulse of the switching code "2," impulsing relay 270 again restores its make-contacts 271 in the above-described non-inductive loop path to the incoming selector switch, FIG. 1. This permits the switch to step its wipers to bank level "2" and set up the connection to a local call termination, possibly by way of other switch trains or with the aid of an operator, to terminal equipment, not shown.

In order to simplify this description, assume that the last-mentioned impulse has resulted in the establishment of a local type call connection. Impulsing relay 270 again reoperates its contacts. Contacts 273, of relay 270, remove ground from the winding of slow-to-release relay 265. Relay 265 releases its contacts, and at make-contacts 269 removes the short circuit path from the lower winding of control relay 210. Relay 210, being a part of the above-traced seizure circuit, again reoperates its contacts and switches the line conductors of the trunk circuit voice branch from a line termination to a transmission-pad termination over paths described above.

The release of contacts 264, of relay 265, removes the non-inductive resistor R5 bridge from the above-traced transmission path having the repeating coil, 232, windings in the loop circuit to the incoming switch train.

The trunk circuit is thereby conditioned to accept supervisory signals returned through the switch train conductors upon the establishment of the connection. In the case of a local type call, as is being described, the answer supervisory signal is a reversal of battery in the loop path to the incoming switch train including the +SW and −SW conductors. This mentioned reversal of battery is effective in the lower winding of supervisory relay 260 to cause its magnetic field to aid, rather than oppose, the magnetic field of the upper winding, as was described above. Relay 260 operates, and by its operation causes the supervisory signal to be converted to a like signal acceptable to the tributary office equipment. More specifically, the outgoing signal conductor M123, including back-contacts 236 of relay 235, is switched from ground potential, on the back-contacts 261 of relay 260, to battery potential by way of the make-contacts 261 and the resistance lamp of the trunk circuit.

It is recalled that connections have been established from the tributary office A, FIG. 1, through the main office trunk circuit, FIG. 2, and incoming switch train, for local type calls without the removal of the pad from the transmission path of the connection. It is obvious that the trunk circuit, FIG. 2, portion of this local call connection consists of two paths, inductively coupled by the left-hand and right-hand windings of repeating coil 232. Namely, the left-hand windings are in series-multiple combination, with the pad elements and connected, by way of above-mentioned relay contacts 221 and 225 of pad-control relay 220, to the voice branch of the trunk circuit, while the right-hand windings of the repeating coil are included in the above-traced impulsing path extending to the incoming switch train, by way of conductors +SW and −SW.

*Incoming toll calls.*—The technique used in the establishment of a toll call connection including the trunk circuit, FIG. 2, and the incoming switching equipment 140, FIG. 1, is generally similar to the technique described above for a local type call. However, in the setting up of a toll call, the selector steps its wipers to bank level "0" and establishes a connection over which the trunk circuit receives a resistance GROUND marking for operating a relay to remove the transmission-loss pad from the transmission branch of the connection. This control path, in the upper portion of FIG. 1, is traced from resistance ground marking 143 applied to a point 142, such as a bank contact, in the incoming switch train 140, through bank level "0" upon which selector wiper W1 resets, and other equipment, not shown, to the EC1 conductor 133 of the trunk circuit, FIG. 2. As has been mentioned above, control relay 210, FIG. 2, reoperates upon establishment of a connection by the switch train, and the remainder of the pad-control path can be traced from the EC1 conductor 133 through make-contacts 257, of relay 250, make-contacts 213 of control relay 210, back-contacts 227 of relay 220, and its upper winding to battery. Pad-control relay 220 operates. The "X" contact springs operate first, before a break of contacts 227, to close a holding path traced from ground on make-contacts 258, of relay 250, through "X" make-contacts 226 and the upper winding of relay 220 to battery. With relay 220 fully operated and in a held condition, its contacts 221, 223, and 225 have operated to remove and to isolate the pad-network from the transmission path and also bring about a retard-coil relationship between the right-hand windings of the repeating coil, 232, and the transmission path of the trunk circuit, rather than the inductive coupling arrangement of the repeating coils as was described for local call connections.

In the case of a toll call, either by fully-automatic ticketing methods or with the aid of an operator, answer supervision is a reversal of battery in the loop path to the incoming switch train, as described above for a local call.

*Incoming tributary tandem call.*—The technique used in the establishment of a tandem call connection, say from tributary office A to tributary office B, by way of the trunk circuit, FIG. 2, and the incoming switching equipment 140, FIG. 1, in the main office, is similar to the switching technique for a toll call as described above except as pointed out herein. In the instant case it has been assumed that the dialing of the code digit "6" will set up a tandem connection to the outgoing access of another trunk circuit, similar to the trunk circuit of FIG. 2, associated with tributary office B. With reference to the main office incoming switching diagram 140, FIG. 1, resistance ground 145 and contacts 144 show the pad-control marking and switching operations, respectively, which are brought into play upon gaining access into the last-mentioned tributary B trunk circuit directly from selector level "6," or possibly by way of other equipment, not shown. For the sake of this description, the portion of the tributary office B trunk circuit, FIG. 2, seized from selector level "6" is traced as ground through the lower winding of pad-control relay 220, then its back-contacts 228, and back-contacts 259, of relay 250, as a path which has been accessed over the EC0 conductor 137. Furthermore, upon the establishment of the tandem call connection, the path is completed between the tributary A and tributary B trunk circuits and the pad-control relay 220 in each circuit operates, one from its lower winding while the other operates from its upper winding. This united action in the two trunk circuits causes the removal of both pad-networks from the transmission path in tandem between the tributaries, as was individually cited in the case of the toll call described above.

It will be recalled that fast-acting-control relay 210, in the tributary A trunk circuit, FIG. 2, restores to the first impulse of a series of impulses, and remains restored for the duration of the series. In advance of the description of the trunk circuit operations on an outgoing call, and particularly of an outgoing tandem call, it is pointed out that the same relay 210 in the tributary office B trunk circuit should also restore at the earliest moment to bring about a line-termination of its voice-branch conductors. For this reason the trunk circuit has facilities for pre-energizing relay 265, FIG. 2, in the tributary office B trunk circuit. The pre-energizing path is traced from ground through back-contacts 213, make-contacts 257, over connections between conductor EC1, 133, to tributary "B" trunk conductor EC0, 137, then back-contacts 259, make-contacts 228 of relay 220, through diode 2 in a forward direction to make-contacts 231 also of relay 220, then make-contacts 285 and 284 of relay 280, back-contacts 274, and through the winding of relay 265 to battery. This path is closed somewhat before the operating path of relay 265 is completed at back-contacts 237 of pulse-out relay 235 responsive to the first dial impulse of a series.

The supervisory technique used on a tandem call differs from the reversal of battery method of a toll call and will be covered in the following paragraphs.

In order to simplify the description of the last-mentioned supervisory technique, assume that the following tributary B trunk circuit relays, FIG. 2, are operated—namely, control relay 210, pad-control relay 220, pulse-out relay 235, and slow-to-release relay 280. The supervisory signal returned from the tributary office B causes impulsing relay 270 to operate and close a supervisory signal path back through the tandem switching to the signal receiving relay of the trunk circuit associated with tributary office A. This path is traced from ground on make-contacts 272, of relay 270, make-contacts 282, then the make-contacts 228, of relay 220, back-contacts 259, over EC0 conductor 137 and tandem selector banks, wipers etc. not shown in FIG. 2 to the EC1 conductor 133 of the tributary office A trunk circuit, also FIG. 2. The path is further traced through make-contacts 257, of relay 250, make-contacts 213 of control relay 210, make-contacts 227 of pad control relay 220, then resistor R6, make-contacts 253 of relay 250, back-contacts 242 of reverse battery relay 240, through diode 1 in the forward direction to the lower winding of pulse-out relay 235 and battery. Relay 235 operates. Make-contacts 236 of relay 235, switch the sig. out conductor 123 from a ground potential to a battery potential through the lamp and thereby transmits the answer supervisory signal back to equipment in tributary office A.

In review of the above-traced paths it is recalled that the EC0 to EC1 path, which passes a resistance ground marking for the operation of the transmission pad-control relay, also is the means for returning supervisory signals upon the establishment of connections for tandem type tributary calls.

OUTGOING CALLS TO TRIBUTARY OFFICE A—GENERAL

The following sub-sections of this specification relate to techniques for the establishment of outgoing tandem, toll, and local type calls from the main office by way of the respective switch trains having selector bank level "4" access into the outgoing branch of the loop-pulsing trunk circuit shown in FIG. 2.

*Outgoing seizure of trunk circuit.*—The trunk circuit shown in FIG. 2 is of the type which furnishes battery potential on the "C" lead as an idle marking to battery searching selector switches. In this case, the marking path is traced from battery through the resistance winding of relay 240, then back-contacts 267 of relay 265, back-contacts 283 of relay 280, and back-contacts 293 of relay 290, to "C" conductor 138. Seizure of the trunk circuit now occurs over a loop path across its + conductor 135 and − conductor 136 of FIG. 2. This loop closes a path, which on the upper conductor is traced through the upper right hand winding of repeating coil 232, back-contacts 255 of relay 250, then back-contacts 244 of battery reversal relay 240, through the upper winding of out-pulsing relay 235 to ground, and further traced on the conductor 136 through the lower right hand winding of repeating coil 232, to back-contacts 253 of relay 250, back-contacts 242, and in a forward direction through diode 1 to the lower winding of relay 235 and battery. Relay 235 operates, and at its contacts 236 switches the signal-out conductor from a ground potential condition to a battery potential through the lamp of FIG. 2. In a well-known manner, this change in potential on the signal out conductor 123 is transmitted by way of terminal apparatus 120, FIG. 1, and the interoffice communication medium 110, to tributary office A, where it brings about a seizure of switching equipment. Further reference to the main office trunk circuit of FIG. 2 shows that multiple paths are closed by make-contacts 238 of out-pulse relay 235—one path is traced from ground through back-contacts 268 of control relay 265 to the upper winding of termination control relay 210 to battery; while the other path is traced through back-contacts 295 of relay 290 and the winding of slow-to-release relay 280 to battery. Relay 280 operates, and at its make-contacts 283 closes ground through back-contacts 293 of relay 290 to the "C" conductor 138 to busy the trunk circuit with respect to any other selector bank access for the duration of the call being established. The relay 210, operated upon seizure during an outgoing call as mentioned above, performs all of the controls on voice-branch conductors with respect to removal of line termination and a switching to the pad-loss network of the trunk circuit as has been traced and described above for an incoming call from the tributary office A.

*General switching operation, outgoing.*—Upon outgoing seizure of the trunk circuit, FIG. 2, for tandem, toll, and local type calls, fast-acting control relay 210 restores its contacts responsively to the first impulse and remains restored for the duration of the impulsing period for exerting a line termination on the voice-branch of the trunk circuit etc. as has been described in the operations on an incoming type call, however, in this case different circuit paths are involved.

The first impulse permits out-pulse relay 235 to restore. Make-contacts 238, of relay 235, open the above-traced path through the upper winding of relay 210. Relay 210 restores its contacts as above-mentioned. Relay 280 does not restore during this first impulse, or any of the following impulses in the series used in the establishment of a connection, but remains operated since it has slow-to-release characteristics. Back-contacts 237, of relay 235, close a path from ground to make-contacts 284 of relay 280, through back-contacts 274 of relay 270, and the winding of slow-to-release relay 265 to battery. Relay 265 operates, and remains operated for the impulsing period—to insure, that relay 210, by way of contacts 268, does not reoperate through its upper winding upon repeated closures of make-contacts 238, of out-pulse relay 235, in establishing the call. The operation of relay 265 furthermore insures, by way of make contacts 269, that the above-traced bridge path remains across the lower-winding of relay 210, preventing the latter from reoperating in response to an answer supervisory signal from tributary office A. The above-mentioned back-contacts 237, upon the first impulse of relay 235, also close a path for the pre-energization of out-pulse relay for the remaining impulses of the series. This path is traced from ground through contacts 237, to make-contacts 285 of relay 280, left to back-contacts 231 of pad-control relay 220, then to make-contacts 266 of relay 265, through resistor R7, through diode 1 and the lower winding of out-pulse relay 235 to battery.

*Outgoing tandem call.*—The following sub-section of this specification describes an outgoing tandem call from tributary office B through the main office switching equipment and trunk circuit to tributary office A. Tributary office B seizure of the trunk circuit, FIG. 2, by way of conductors +135, −136, and C138, has been generally described above, but in this case, access into the EC0 conductor 137 is also involved, both as a means for controlling the transmission-loss pad and as a medium for the transfer of supervisory signals between the tributary B and the tributary office A trunk circuits per FIG. 2.

Reference is now made to the pad-control path (EC0–EC1) which was traced in the "incoming tandem" portion of this specification, and which included ground on the lower winding of pad-control relay 220, in the tributary office B trunk circuit, connected in series through a number of contacts to the upper winding of pad-control relay 220 and battery in the tributary office A trunk circuit. In the case being described, i.e. an outgoing tandem call, a similar path (EC1–EC0) could be traced in the reverse direction using resistance (upper winding of relay 220) battery as the point of origin for the path. This resistance battery marking on an outgoing tandem call connection is shown in simplified form by the designation 155 of the outgoing switching, 150, diagram of FIG. 1.

Both pad-control relays, 220, in the EC1–EC0 traced path operate their "X" contacts and lock-up to ground potential at either make-contacts 258 or make-contacts 281, as is obvious, and then fully operate all of their spring contacts. This results in a removal of the pad network from the transmission path through each trunk circuit and a preparation of the following described paths for the pre-energization of relay 265 and then for the transfer of supervisory signals.

In order to bring about the above-mentioned line termination on the voice-branch of the trunk circuit on an outgoing call, and particularly on a tributary tandem call, as soon as possible, relay 265 is pre-energized over the EC1–EC0 path connections between the tributary A and tributary B trunk circuits. This path was traced in the description of an "incoming tributary tandem call" and is now retraced as follows from ground through back-contacts 213, make-contacts 257, over connections between conductor EC1, 133, to tributary "B" trunk conductor EC0, 137, then back-contacts 259, make-contacts 228 of relay 220, through diode 2 in a forward direction to make-contacts 231 also of relay 220, then make-contacts 285 and 284 of relay 280, back-contacts 274, and through the winding of relay 265 to battery.

The answer supervisory signal returned from the tributary office A causes a ground to be set on sig. in conductor 124 which enables relay 270 to operate over the bridging path around the lower winding of relay 210. The supervisory signal is then transferred as a ground through make-contacts 272, of relay 270, make-contacts 282, make-contacts 228, of relay 220, then back-contacts 259 to EC0 conductor 137, through the switch train to EC1 conductor 133, of the other trunk circuit, FIG. 2, then make-contacts 257, make-contacts 213, make-contacts 227 of relay 220, through resistor R6, up to make-contacts 253 of relay 250, back-contacts 242, then through diode 1 in a forward direction to the lower winding of out-pulse relay 235 and battery. Relay 235 operates, and through its make-contacts 236 returns battery potential on the sig. out conductor 123 for answer supervision to tributary office B, where the tandem call has originated.

*Outgoing local call.*—In the establishment of an outgoing call, of the local type, from the main office, seizure of the trunk circuit, FIG. 2, is over the conductors designated +135, −136, and C138. Furthermore, there is no point of access to the EC0 conductor 137 for pad-control and supervision purposes as described in the above sub-sections of this specification. Consequently, pad-control relay 220 remains in an unoperated condition and does not remove the pad-control network, traced above through back contacts 221 and 225, from the transmission path of the call.

The answer supervisory signal for an outgoing local call results in the operation of relay 270. A control path for the signal is traced from ground on make-contacts 272 of relay 270, through make-contacts 282, left to back-contacts 229 of pad-control relay 220, and through the upper winding of reverse battery relay 240 to battery. Relay 240 operates, and by the well-known arrangement of its contacts 241, 242, 243, and 244 brings about a reversal of the ground and battery potentials, previously on the transmission path conductors +124 and −126 respectively, and thereby returns answer supervision to the switching equipment according to familiar techniques for loop-type switch trains.

It will be understood, from what has been said above, that fast-acting relay 210 controls the voice-branch line termination of the trunk circuit, FIG. 2, upon receipt of impulses used in the establishment of both incoming and outgoing connections for toll, tandem, and local types of calls between the main office and associated tributary offices. Furthermore, the relay 210, upon the establishment of incoming connections through the trunk circuit, sets up a combination path for operation of the pad-controlling relay 220, and as a preparation for the passage of some supervisory signals returned over the last-mentioned connection to the trunk circuit supervisory means.

It is recalled that the effectiveness of the pad on the transmission-level of the transmission path is controlled by relay 220 responsive to the resistance ground marking received over the above-mentioned combination path from a point in the incoming switch train, and also responsive to the resistance battery marking received over another combination marking-supervisory path extending to the outgoing switch train. In each case, the marking received by pad-control relay 220 of the trunk circuit characterizes the use, or non-use, of the pad on the various types of calls, more specifically: toll, tandem, and local type calls.

Having fully described the features and aspects of my invention, what I consider to be new will be pointed out in the appended claims.

What is claimed is:

1. In a telephone system including a main office arranged for the switching of toll, local and tandem types of telephone connections, and also including a plurality of tributary offices: a two-way trunk circuit in said main office, said circuit including a transmission-level controlling pad; a communication medium interconnecting said trunk circuit with one of said tributary offices; incoming and outgoing switching means including a train of pulse-responsive switches having wipers and contact banks over which said types of telephone connections from and to said trunk circuit are extended respectively; means for applying an electric marking to a point in said incoming switch train by a way of a corresponding one or ones of said wipers and banks; other means for applying an electric marking to a point in said outgoing switch train by way of a corresponding one or ones of said wipers and banks; and control means in said trunk circuit which, depending on the direction of said telephone connection, are responsive to one or the other of said applied markings to control the effectiveness of said pad in accordance with the type of the telephone connection.

2. The combination in a telephone system as claimed in claim 1, wherein said control means in said trunk circuit is operated in response to said marking in the case of said toll and tandem types of telephone connections to remove said transmission level controlling pad from said trunk circuit.

3. In a telephone system including a main office and a plurality of tributary offices: a trunk circuit in said main office; switching means including a train of pulse-responsive switches having wiper and contact banks over which telephone connections including said trunk circuit are established; a communication medium interconnecting said trunk circuit with one of said tributary offices; terminal apparatus interposed between said medium and said trunk circuit having a voice branch including two line conductors and having a signalling branch including an incoming signalling conductor and an outgoing signalling conductor; a line termination in said trunk circuit normally connected across said line conductors; said trunk circuit also having an impulse responsive relay and fast-acting control relay each having a winding connected in said incoming signalling conductor, said control relay being operated upon seizure of said trunk circuit to disconnect said line termination, and being released immediately upon receipt of the first dial pulse to reconnect said line termination, and means controlled by said impulse responsive relay for holding said control relay in released condition until the end of the series of dial pulses.

4. The combination in a telephone system as claimed in claim 1; further including terminal apparatus interposed between said communication medium and said trunk circuit comprising a voice branch including two line-conductors, and a signaling branch having an incoming signal conductor and an outgoing signal conductor; a line termination in said trunk circuit normally connected across said line-conductors; said trunk circuit also having an impulse responsive relay and a fast-acting control relay each having a winding connected in said incoming signaling conductor; said control relay being operated upon seizure of said trunk circuit to disconnect said line termination for switching said line-conductors to said transmission level controlling pad and preparing an operating circuit for said control means in the trunk circuit, and being released immediately upon receipt of the first dial pulse to reconnect said line termination; and means controlled by said impulse responsive relay for holding said control relay in released condition until the end of the series of dial pulses; whereby upon the establishment of said incoming type of telephone connection by said incoming switch train said control means in said trunk circuit operates responsively to said first-mentioned electric marking over said prepared operating circuit.

5. The combination in a telephone system as claimed in claim 2, wherein said trunk circuit further includes supervisory means; wherein said trunk circuit and said incoming and outgoing switch trains include combination-marking-and-supervisory conductors extended over corresponding wipers and banks; and wherein said control means in said trunk circuit operates responsively to said markings for transferring said conductors to said supervisory means.

References Cited by the Examiner

UNITED STATES PATENTS

| | | | |
|---|---|---|---|
| 1,882,851 | 10/32 | Matthies | 179—16 |
| 2,093,667 | 9/37 | Winsor | 179—16 |
| 2,620,402 | 12/52 | Botsford et al. | 179—81 |
| 2,806,086 | 9/57 | Fisher | 179—16 |

ROBERT H. ROSE, *Primary Examiner.*

WALTER L. LYNDE, *Examiner.*